(12) United States Patent
Longobardi et al.

(10) Patent No.: US 11,501,396 B2
(45) Date of Patent: Nov. 15, 2022

(54) SYSTEM AND METHOD FOR COLLECTING AND RETURNING LUGGAGE AT PUBLIC TRANSPORTATION SYSTEMS

(71) Applicant: HCL TECHNOLOGIES ITALY S.P.A., Milan (IT)

(72) Inventors: Giuseppe Longobardi, Rome (IT); Maria Sbriccoli, Rome (IT); Enrica Alberti, Rome (IT); Andrea Fiore, Rome (IT)

(73) Assignee: HCL TECHNOLOGIES ITALY S.P.A., Milan (IT)

( * ) Notice: Subject to any disclaimer, the term of this patent is extended or adjusted under 35 U.S.C. 154(b) by 402 days.

(21) Appl. No.: 16/721,730

(22) Filed: Dec. 19, 2019

(65) Prior Publication Data

US 2021/0192655 A1 Jun. 24, 2021

(51) Int. Cl.
*G06Q 99/00* (2006.01)
*G06Q 50/26* (2012.01)
*G06Q 10/08* (2012.01)
*G06K 19/07* (2006.01)
*G08B 13/24* (2006.01)
*G06K 7/14* (2006.01)
*G06K 7/10* (2006.01)
*G06K 19/06* (2006.01)
*H04W 12/47* (2021.01)

(52) U.S. Cl.
CPC ....... *G06Q 50/265* (2013.01); *G06K 7/10297* (2013.01); *G06K 7/1413* (2013.01); *G06K 19/06028* (2013.01); *G06K 19/0723* (2013.01); *G06Q 10/0836* (2013.01); *G08B 13/2434* (2013.01); *G08B 13/2454* (2013.01); *H04W 12/47* (2021.01)

(58) Field of Classification Search
CPC . G06Q 50/265; H04W 12/47; G06K 7/10297; G06K 19/0723
USPC ....................................................... 705/325
See application file for complete search history.

(56) References Cited

U.S. PATENT DOCUMENTS 5,165,526 A * 11/1992 Conklin, Jr. ......... B65G 17/068
198/804
6,671,987 B1 1/2004 Fenton
(Continued)

FOREIGN PATENT DOCUMENTS

| | | |
|---|---|---|
| CN | 103209896 A | 7/2013 |
| CN | 106056170 A | 10/2016 |
| FR | 3049173 A1 | 9/2017 |

*Primary Examiner* — Ahshik Kim
(74) *Attorney, Agent, or Firm* — Kendal Sheets

(57) ABSTRACT

Disclosed are a system and a method for collecting and returning luggage at public transportation systems. The method includes storing characteristic features and metadata corresponding to a luggage and its individual owner, and associating a color while collecting the luggage at a luggage submitting terminal. The luggage may be easily identified at a luggage providing terminal, using an identification tag attached to the luggage and the associated metadata (including the associated colour). Upon an end of journey, the individual may be allowed to pick the luggage upon providing a handshake signal. In case the handshake signal is not provided and the individual owner's metadata is not matched, security agencies may be alerted about picking of the luggage by another individual.

16 Claims, 3 Drawing Sheets

(56) References Cited

U.S. PATENT DOCUMENTS

| | | | | |
|---|---|---|---|---|
| 10,123,603 | B1* | 11/2018 | Glickman | A45C 5/03 |
| 10,969,499 | B2* | 4/2021 | Naim | H04W 4/029 |
| 11,069,017 | B1* | 7/2021 | Trelin | G06Q 50/265 |
| 2009/0015398 | A1* | 1/2009 | Bhogal | A45C 13/18 |
| | | | | 340/572.1 |
| 2009/0219169 | A1* | 9/2009 | Herwats | G07C 9/27 |
| | | | | 340/8.1 |
| 2013/0130741 | A1* | 5/2013 | Grimard | A45C 13/42 |
| | | | | 455/556.1 |
| 2013/0211864 | A1 | 8/2013 | Sanderson et al. | |
| 2014/0184387 | A1* | 7/2014 | Svec | G06Q 10/083 |
| | | | | 340/8.1 |
| 2016/0189507 | A1 | 6/2016 | Rayner | |

* cited by examiner

SYSTEM AND METHOD FOR COLLECTING AND RETURNING LUGGAGE AT PUBLIC TRANSPORTATION SYSTEMS

The present application does not claim priority from any patent application.

TECHNICAL FIELD

The present subject matter described herein, in general, relates to handling of luggage at public transportation systems.

BACKGROUND

Today, millions of individuals traverse through using the major transportation means, such as trains and air planes. Such individuals carry luggage with them that is generally submitted at luggage counters, such as at airports, before beginning of the journey. Immediately after end of the journey, while the luggage is to be collected, all the travelling individuals gather at a baggage collection belt. Within such big crowd of people, one cannot easily track placement of their luggage on the baggage collection belt, and it becomes difficult to identify one's own luggage. Moreover, the luggage is placed on the baggage collection belt in a random order (sometimes only business class passenger's luggage is placed first). A luggage's owners may be close to the belt, ready to pick them up, or standing far back in a queue, or may be busy in some other activities, such as talking or using their cell phones, because of which they may not be able to pay attention to their luggage. In such conditions, the baggage owners may not be able to pick up their luggage in time, resulting in overall delay in their journey. Further, there also remains the threat of theft of the luggage or someone picking another individual's luggage by mistake due to similar appearance of the luggage.

Thus, such orderless movement and collection of luggage on the luggage collection areas need to be organized, through which the above mentioned problems could be overcome.

SUMMARY

Before the present systems and methods for collecting and returning luggage at public transportation systems, it is to be understood that this application is not limited to the particular systems, or methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application.

This summary is provided to introduce aspects related to a system and a method for collecting and returning luggage at public transportation systems. This summary is not intended to identify essential features of the claimed subject matter nor is it intended for use in determining or limiting the scope of the claimed subject matter.

In one implementation, a system for collecting and returning luggage at public transportation systems. In one aspect, the system may comprise a luggage submitting terminal for storing characteristic features and metadata corresponding to a luggage of an individual while collecting the luggage. The system may further comprise a luggage providing terminal for identifying the luggage using an identification tag attached to the luggage, and allowing the individual to pick the luggage upon receiving a handshake signal from the individual, else alerting security agencies about picking of the luggage by another individual while the handshake signal is not received.

In one implementation, a method for collecting and returning luggage at public transportation systems is disclosed. In one aspect, the method may comprise storing characteristic features and metadata corresponding to a luggage of an individual while collecting the luggage at a luggage submitting terminal. The method may further comprise identifying the luggage at a luggage providing terminal, using an identification tag attached to the luggage. The method may further comprise allowing the individual to pick the luggage upon receiving a handshake signal from the individual, else alerting security agencies about picking of the luggage by another individual while the handshake signal is not received.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for generating synthetic data for minority classes in a large dataset, similar or equivalent to those described herein can be used in the practice or testing of embodiments of the present disclosure, the exemplary, systems and methods for generating synthetic data for minority classes in a large dataset are now described. The disclosed embodiments for collecting and returning luggage at public transportation systems are merely examples of the disclosure, which may be embodied in various forms.

Various modifications to the embodiment will be readily apparent to those skilled in the art and the generic principles herein may be applied to other embodiments for collecting and returning luggage at public transportation systems. However, one of ordinary skill in the art will readily recognize that the present disclosure for collecting and returning luggage at public transportation systems is not intended to be limited to the embodiments described, but is to be accorded the widest scope consistent with the principles and features described herein.

Figure 1:
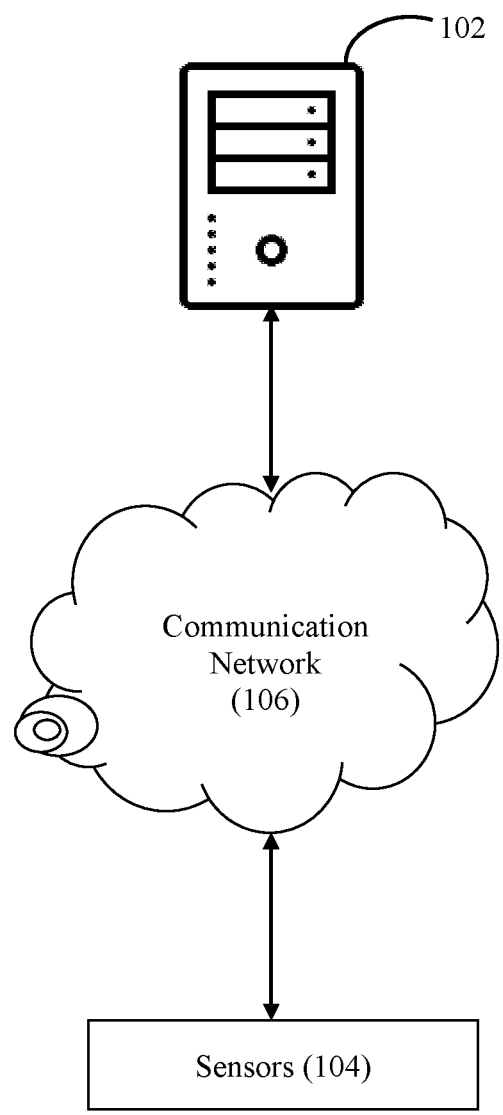
FIG. 1 illustrates a network architecture diagram of a system 102 for managing collection and return of luggage at public transportation systems, in accordance with an embodiment of the present subject matter.

Referring now to FIG. 1, a network implementation diagram of a system 102 for managing collection and return of luggage at public transportation systems, in accordance with an embodiment of the present subject matter may be described. In one example, the system 102 may be connected with several sensors 104 through a communication network 106. The sensors 104 may be positioned along several locations of a public transportation system, particularly along a luggage submitting terminal, luggage providing terminal, and baggage collection belt. The sensors 104 may include Infrared (IR) sensors, Near Field Communication (NFC) and Radio Frequency Identification (RFID) tag readers, cameras, Light Amplification by Stimulated Emission of Radiation (LASER) sensors and transmitters, other known sensors that could be utilized in the embodiments described henceforth.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 104 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like.

In one embodiment, the system 102 may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor may be configured to fetch and execute computer-readable instructions stored in the memory.

The I/O interface may include a variety of software and hardware interfaces, for example, a web interface, a graphical user interface, and the like. The I/O interface may allow a user to interact with the system. Further, the I/O interface may enable the system to communicate with the sensors 104, and other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite.

The memory, amongst other things, serves as a repository for storing data. The memory may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The embodiments described henceforth are meant to describe a method for collecting and returning luggage at public transportation systems. At first, a luggage carried by an individual may be identified. Characteristic features and metadata corresponding to the luggage may be stored while collecting the luggage at a luggage submitting terminal. The metadata may comprise details of the individual, picture of the individual, picture of the luggage, colour of the luggage, and details of a tag attached to the luggage. The picture of the individual could be obtained from a passport or another document of the individual. Further the tag may be attached to the luggage during check-in at airport.

In one embodiment, while multiple luggage of similar colour or appearance are identified, a unique colour may be assigned to the luggage of the individual. In one case, the unique colour may be selected amongst a predefined set of colours. The unique colour may help the user in identifying his luggage, in the manner described henceforth. Upon assigning, the unique colour may be communicated to the individual by sending a text message or image file on a phone number or a mobile application present on the phone of the individual, or printing the unique colour on a boarding pass of the individual.

Figure 2A:
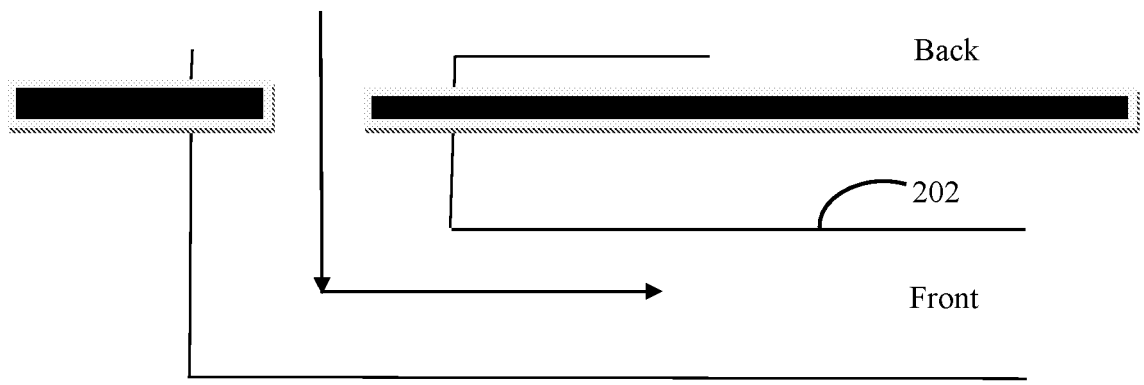
FIG. 2a illustrates movement of luggage on a luggage collection belt 202, in accordance with an embodiment of the present subject matter.
Figure 2B:
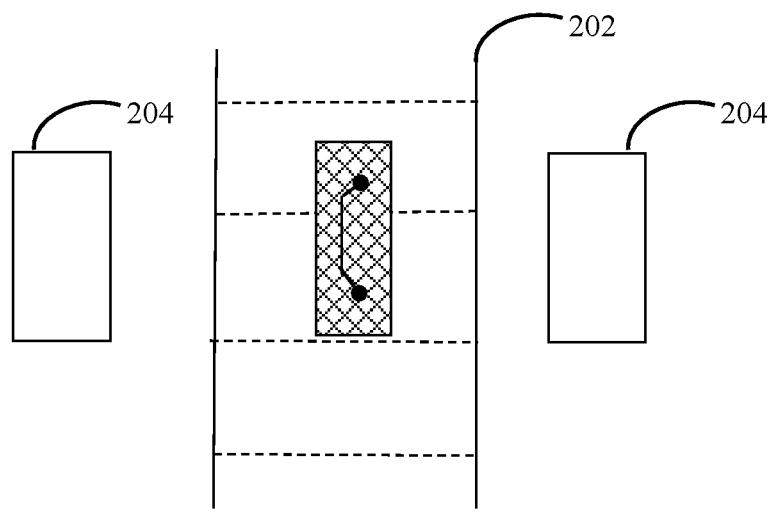
FIG. 2b illustrates identification of the luggage on the luggage collection belt 202, in accordance with an embodiment of the present subject matter.
Figure 2C:
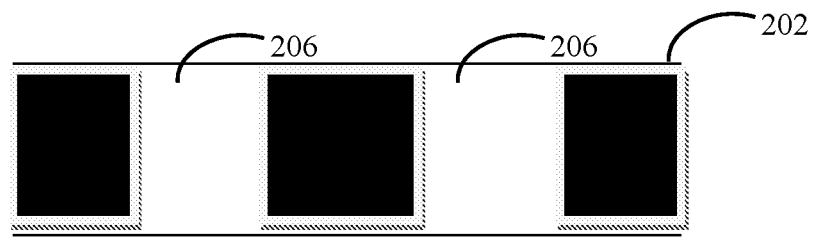
FIG. 2c illustrates the luggage collection belt 202 comprising transparent sections 206, in accordance with an embodiment of the present subject matter.

Upon end of a journey, the luggage may be transferred on a luggage collection belt 202. In FIG. 2a, movement of the luggage, from a back portion to a front portion, on the luggage collection belt 202, is illustrated through an arrow. After the luggage is transferred on the luggage collection belt 202, the luggage may be identified on using photo sensors 204 positioned along sides of the luggage collection belt 202, as illustrated in FIG. 2b. The luggage of the individual may be present amongst luggages of several other individuals. To allow the individual to easily identify his luggage, the luggage may be illuminated using lights of the unique colour. The lights may be present over, beneath, or around the luggage. In one case, lighting apparatus such as Light Emitting Diodes (LEDs) may be present beneath transparent sections 206 of the baggage collection belt 202 upon which the luggage is kept. The baggage collection belt 202 comprising transparent sections 206 are illustrated in FIG. 2c.

In one embodiment, the luggage may be identified at a luggage providing terminal, using an identification tag attached to the luggage. The identification tag attached to the luggage may be a Near Field Communication (NFC) tag, Radio Frequency Identification (RFID) tag, a barcode, or another such mean providing unique identity. Thereafter, the user may be allowed to pick his luggage upon providing a handshake signal to the system 102. The handshake signal may be provided through a message from a registered mobile number of the individual, a message from an application present on the individual's phone, and scanning of a boarding pass of the individual.

In one case, the luggage may be picked without providing the handshake signal. Picking up of the luggage, from the baggage collection belt, may be determined using one or more sensors, such as weight sensors or light sensors such as infrared sensor. During such instance, if the handshake signal is not received, a camera present nearby the baggage collection belt may follow the luggage. The luggage may be identified and followed based on the metadata information captured during submission of the luggage. Further, face of the person carrying the luggage may also be compared with the one registered during the check-in. If the face is recognized, then a reminder to send the handshake signal may be sent again to the individual.

Even after reminding the individual, the handshake signal is not received, security agencies may be alerted that the luggage of the individual is picked by another individual. The security agencies may be alerted by different means, such as providing the metadata, raising an alarm, or pointing the luggage by a light beam. The light beam used to point the luggage may be of the same colour assigned to the luggage and may be driven by the camera system. The light beam may follow the luggage along a claim area and security personnel may be alerted by providing them with all the metadata information. In this manner, the security personnel will have tracking images, the picture of the luggage, person carrying the luggage, and position of the luggage constantly indicated by the light beam. For accurate and long range pointing of the luggage, a Light Amplification by Stimulated Emission of Radiation (LASER) beam could be used. Further, an actual owner of the luggage could also be notified while some other person tries to carry the luggage. The owner could be notified through a text message, or an application for managing handling of the luggage at the public transportation systems, such as airports.

The above described embodiments for collecting and returning luggage at public transportation systems provide for several advantages including minimization of waiting time to claim luggage, minimizing theft or exchange of luggage. By minimizing luggage cycling on the baggage collection belt for a long time, the same belt could be reused quickly for handling luggage of individuals travelling through another flight, thereby increasing luggage handling capacity of the baggage collection belt. The above described embodiments also allow for tracking of luggage delivery and pick-up in real time, and eliminate the chances of intentional leaving behind of luggage.

Figure 3:
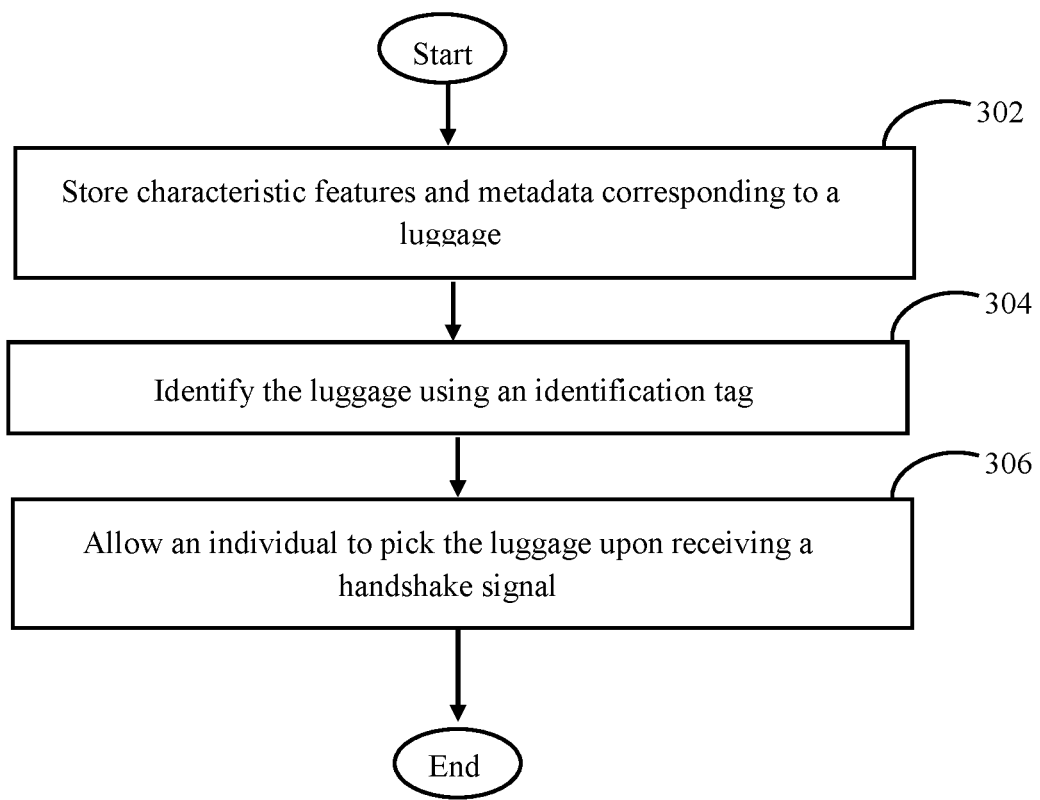
FIG. 3 illustrates a method 300 for collecting and returning luggage at public transportation systems, in accordance with an embodiment of the present subject matter.

Referring now to FIG. 3, a method 300 for collecting and returning luggage at public transportation systems is described, in accordance with an embodiment of the present subject matter. The order in which the method 300 for collecting and returning luggage at public transportation systems is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, characteristic features and metadata corresponding to a luggage of an individual may be stored. The characteristic features and the metadata may be stored while collecting the luggage at a luggage submitting terminal.

At block 304, the luggage may be identified at a luggage providing terminal. In one case, the luggage may be identified using an identification tag attached to the luggage.

At block 306, the individual may be allowed to pick the luggage upon receiving a handshake signal from the individual. Alternatively, while the handshake signal is not received, security agencies may be alerted about picking of the luggage by another individual.

Although implementations for methods and systems for collecting and returning luggage at public transportation systems have been described in language specific to structural features and/or methods, it is to be understood that the appended claims are not necessarily limited to the specific features or methods described. Rather, the specific features and methods are disclosed as examples of implementations for collecting and returning luggage at public transportation systems.

The invention claimed is:

1. A method for collecting and returning luggage at public transportation systems, the method comprising:
storing characteristic features and metadata corresponding to a luggage of an individual while collecting the luggage at a luggage submitting terminal;
assigning a unique colour to the luggage for identifying the luggage at a luggage providing terminal, using an identification tag attached to the luggage, wherein lights of the unique colour are switched on around the luggage to help the individual in identifying his luggage, and wherein the lights are present beneath a transparent section of the baggage collection belt upon which the luggage is kept; and
allowing the individual to pick the luggage upon receiving a handshake signal from the individual, else alerting security agencies about picking of the luggage by another individual while the handshake signal is not received.

2. The method as claimed in claim 1, wherein the metadata comprises details of the individual, picture of the individual, picture of the luggage, colour of the luggage, and details of a tag attached to the luggage.

3. The method as claimed in claim 1, wherein the identification tag attached to the luggage is one of a Near Field Communication (NFC) tag, Radio Frequency Identification (RFID) tag, and a barcode.

4. The method as claimed in claim 1, wherein the handshake signal is provided through one of a message from a registered mobile number of the individual, a message from an application present on the individual's phone, and scanning of a boarding pass of the individual.

5. The method as claimed in claim 1, wherein the security agencies are alerted by providing the metadata, raising an alarm, or pointing the luggage by a light beam.

6. The method as claimed in claim 1, wherein the unique colour is assigned to the luggage while other luggage of similar colour or appearance exists.

7. The method as claimed in claim 6, wherein the unique colour is communicated to the individual by one of sending a text message or image file on a phone number or a mobile application present on the phone of the individual, and printing the unique colour on a boarding pass of the individual.

8. A system for collecting and returning luggage at public transportation systems, the system comprising:

a luggage submitting terminal for storing characteristic features and metadata corresponding to a luggage of an individual while collecting the luggage; and a luggage providing terminal for:
  assigning a unique colour to the luggage for identifying the luggage at a luggage providing terminal, using an identification tag attached to the luggage, wherein lights of the unique colour are switched on around the luggage to help the individual in identifying his luggage, and wherein the lights are present beneath a transparent section of the baggage collection belt upon which the luggage is kept; and
  allowing the individual to pick the luggage upon receiving a handshake signal from the individual, else alerting security agencies about picking of the luggage by another individual while the handshake signal is not received.

9. The system as claimed in claim 8, wherein the metadata comprises details of the individual, picture of the individual, picture of the luggage, colour of the luggage, and details of a tag attached to the luggage.

10. The system as claimed in claim 8, wherein the identification tag attached to the luggage is one of a Near Field Communication (NFC) tag, Radio Frequency Identification (RFID) tag, and a barcode.

11. The system as claimed in claim 8, wherein the handshake signal is provided through one of a message from a registered mobile number of the individual, a message from an application present on the individual's phone, and scanning of a boarding pass of the individual.

12. The system as claimed in claim 8, wherein the security agencies are alerted by providing the metadata, raising an alarm, or pointing the luggage by a light beam.

13. The system as claimed in claim 8, wherein the unique colour is assigned to the luggage while other luggage of similar colour or appearance exists.

14. The system as claimed in claim 13, wherein the unique colour is communicated to the individual by one of sending a text message or image file on a phone number or a mobile application present on the phone of the individual, and printing the unique colour on a boarding pass of the individual.

15. An apparatus for handling luggage at public transportation systems, the apparatus comprising one of:
  a luggage submitting unit for storing characteristic features and metadata corresponding to luggage of individuals while collecting the luggage, wherein the characteristic features and the metadata are stored on a central server; and
  a luggage providing unit for:
    assigning a unique colour to the luggage for identifying the luggage by matching information retrieved from identification tags attached to each of the luggage with the characteristic features and the metadata received from the central server, wherein lights of the unique colour are switched on around the luggage to help the individual in identifying his luggage, and wherein the lights are present beneath a transparent section of the baggage collection belt upon which the luggage is kept; and
    allowing each of the individuals to pick their luggage upon receiving handshake signals from the individuals, else alerting security agencies about picking of the luggage by another individual while a handshake signal is not received by any one of the individuals.

16. The apparatus of claim 15, wherein the luggage submitting unit and the luggage providing unit utilize conveyor belts.

* * * * *